(12) United States Patent
Zhang et al.

(10) Patent No.: US 12,164,999 B2
(45) Date of Patent: Dec. 10, 2024

(54) DATA MATRIX CODE, GENERATING METHOD AND DEVICE THEREOF, AND DECODING METHOD AND DEVICE THEREOF

(71) Applicant: HANGZHOU BIOBANK BIOTECH INC., Hangzhou (CN)

(72) Inventors: Yang Zhang, Hangzhou (CN); Linlin Li, Hangzhou (CN)

(73) Assignee: HANGZHOU BIOBANK BIOTECH INC., Hangzhou (CN)

(*) Notice: Subject to any disclaimer, the term of this patent is extended or adjusted under 35 U.S.C. 154(b) by 603 days.

(21) Appl. No.: 17/634,696

(22) PCT Filed: Apr. 1, 2019

(86) PCT No.: PCT/CN2019/080729
§ 371 (c)(1),
(2) Date: Feb. 11, 2022

(87) PCT Pub. No.: WO2020/181592
PCT Pub. Date: Sep. 17, 2020

(65) Prior Publication Data
US 2022/0327302 A1    Oct. 13, 2022

(30) Foreign Application Priority Data
Mar. 13, 2019  (CN) .......................... 201910189002.2

(51) Int. Cl.
*G06K 7/14*   (2006.01)
*G06K 19/06*  (2006.01)

(52) U.S. Cl.
CPC ......... *G06K 7/1417* (2013.01); *G06K 7/1456* (2013.01); *G06K 19/06037* (2013.01); *G06K 2019/06225* (2013.01)

(58) Field of Classification Search
CPC ............... G06K 7/1417; G06K 7/1456; G06K 19/06037; G06K 2019/06225
See application file for complete search history.

(56) References Cited

U.S. PATENT DOCUMENTS

| | | | |
|---|---|---|---|
| 2007/0046961 A1 | 3/2007 | Kashibuchi et al. | |
| 2011/0000958 A1* | 1/2011 | Herzig | G06K 7/1093 235/375 |

FOREIGN PATENT DOCUMENTS

| | | |
|---|---|---|
| CN | 102194091 A | 9/2011 |
| CN | 102968654 A | 3/2013 |

(Continued)

OTHER PUBLICATIONS

The World Intellectual Property Organization (WIPO) International Search Report for PCT/CN2019/080729 Nov. 27, 2019 6 pages (with translation).

*Primary Examiner* — Laura A Gudorf
(74) *Attorney, Agent, or Firm* — ANOVA LAW GROUP, PLLC

(57) ABSTRACT

Disclosed is a Data Matrix (DM) code. An image of the DM code consists of several color blocks arranged in a rectangular array, a circle of color blocks on the edge of the image constitutes a positioning region, and the color blocks inside the image constitute a coding region; the positioning region includes an "L"-shaped edge and a positioning edge opposite to the "L"-shaped edge, wherein the colors of the color blocks include at least three of eight colors, the eight colors being three standard RGB colors, four standard CMYK colors, and white. The positioning edge is formed by alternately arranging color blocks of two colors that are black after filtering by a channel in any color of RGB and white after filtering by a channel in the same color.

10 Claims, 3 Drawing Sheets

(56) References Cited

FOREIGN PATENT DOCUMENTS

CN 105426945 A 3/2016
WO WO-2017198189 A1 * 11/2017 ............. G06K 19/06

* cited by examiner

| 110 | 101 | 011 | 101 | 011 | 101 | 011 | 101 | 011 | 101 |
|---|---|---|---|---|---|---|---|---|---|
| 110 | 100 | 000 | 011 | 110 | 001 | 111 | 010 | 010 | 011 |
| 110 | 010 | 111 | 010 | 110 | 000 | 100 | 101 | 110 | 101 |
| 110 | 100 | 110 | 011 | 010 | 100 | 100 | 000 | 110 | 011 |
| 110 | 110 | 010 | 101 | 110 | 001 | 101 | 001 | 110 | 101 |
| 110 | 001 | 101 | 111 | 000 | 011 | 101 | 010 | 111 | 011 |
| 110 | 111 | 100 | 100 | 111 | 011 | 010 | 010 | 111 | 101 |
| 110 | 000 | 100 | 011 | 101 | 001 | 010 | 001 | 101 | 011 |
| 110 | 011 | 101 | 110 | 001 | 100 | 111 | 001 | 111 | 101 |
| 110 | 110 | 110 | 110 | 110 | 110 | 110 | 110 | 110 | 110 |

DATA MATRIX CODE, GENERATING METHOD AND DEVICE THEREOF, AND DECODING METHOD AND DEVICE THEREOF

CROSS-REFERENCES TO RELATED APPLICATIONS

This application is a national stage application of PCT Patent Application No. PCT/CN2019/080729, filed on Apr. 1, 2019, which claims priority to Chinese Patent Application Ser. No. 201910189002.2, filed on Mar. 13, 2019, the content of all of which is incorporated herein by reference.

TECHNICAL FIELD

The present invention belongs to the technical field of two-dimensional codes, and in particular relates to a Data Matrix (DM) code, a generating method and device thereof, and a decoding method and device thereof.

BACKGROUND

Datamatrix (DM) codes have been widely used due to its high coding density and small sizes. As two-dimensional (2D) codes are applied in more and more fields, however, the information capacity that 2D codes are required to carry is increasingly high. In some fields, the space that can be used to mark a 2D code is very restricted. For example, storage tubes that are used to store pharmaceutical compounds, nucleic acids or trace-level samples are small in size, but their quantity is tremendous and repeated use is impossible. Owing to limitations imposed by the resolutions of code reading devices and also by the bottom area of the tubes, the way of raising the coding information capacity by increasing the number of DM coding matrices has approached its limit, so the coding information capacity cannot be enhanced by increasing the number of coding matrices. Data represented by a block is originally 1 byte due to a single color, and is increased, by introducing 8 colors to create a 2D color code, to 3 bytes, which is a threefold increase in coding capacity compared with that before introduction of those colors. That is, with the sizes of the coding matrix and identification symbols remaining unchanged, the DM code that originally encodes 12-bit information can now contain 36-bit information, meanwhile the corresponding error correction code capacity has also been raised by three times. This not only completely solves the issue of insufficient coding capacity in small-area 2D codes, but also improves the reliability of decoding 2D codes. A few design methods for 2D color codes are already commercially available, but their coding and decoding methods fail to achieve a compatibility with existing Datamatrix standards, making it difficult to carry out conversions in user systems.

To summarize, there exists a need to provide a new 2D color code coding and decoding method that is capable of achieving a better compatibility with Datamatrix standards and increasing coding capacity as well.

SUMMARY

An object of the present invention is to overcome the shortcomings in the prior art, and to provide a DM code, a generating method and device thereof, and a decoding method and device thereof. Six colors are added on the basis of an original Datamatrix data structure, and form, together with the original two colors, i.e., black and white, a new color channel, thereby creating a 2D color code. There is a threefold increase in coding capacity compared with that before addition of the six colors, while at the same time maximally remaining compatible with the existing black and white Datamatrix coding system.

To solve the technical problems in the prior art, disclosed in the present invention is a DM code. An image of the DM code consists of several color blocks arranged in a rectangular array, a circle of color blocks on the edge of the image constitute a positioning region, and the color blocks inside the image constitute a coding region; the positioning region includes an "L"-shaped edge and a positioning edge opposite to the "L"-shaped edge;

the colors of the color blocks include at least three of eight colors, the eight colors being three standard Red, Green, Blue (RGB) colors, four standard Cyan, Magenta, Yellow, Black/Key (CMYK) colors, and white, the positioning edge is formed by alternately arranging color blocks of two colors that are black after filtering by a channel in any color of RGB and white after filtering by a channel in the same color.

Also disclosed in the present invention is a generating method for the DM code, which includes the following procedures:

reading source data information; and converting the source data information into binary data code streams according to corresponding rules in Datamatrix coding rules;

the following procedures are also included:

successively grouping the binary data code streams in groups of three values, so as to obtain several data segments;

converting each data segment into a corresponding color in accordance with a coding mapping rule, the coding mapping rule involving: making 1 equivalent to 255 and 0 equivalent to 0 in each data segment; and based on a particular order of coloring, successively enabling 0 and 255 in the data segment to correspond to each color channel of RGB, thereby generating particular colors; and generating a DM code image by filling color blocks in accordance with the converted colors and a filling rule in the Datamatrix coding rules.

Further, when the particular order of coloring, in the coding mapping rule, is red, green and blue in sequence, a corresponding relationship between the data segment and each color is as follows:

000 corresponds to black, 001 corresponds to blue, 010 corresponds to green, 011 corresponds to cyan, 100 corresponds to red, 101 corresponds to magenta, 110 corresponds to yellow, and 111 corresponds to white.

Also disclosed in the present invention is a decoding method for the DM code, which includes the following procedures:

reading a DM code image;

determining a positioning region and a coding region of the DM code image;

restoring the coding region to binary data code streams; and converting the binary data code streams into source data information according to corresponding rules in Datamatrix decoding rules;

the procedure of determining a positioning region and a coding region of the DM code image involves:

performing successive filtering by three color channels, i.e., RGB, so as to obtain three coded grayscale images corresponding to each color channel, respectively; and determining, based on the obtained grayscale images, the positioning region and the coding region of the DM code image;

the procedure of restoring the coding region to binary data code streams involves:

converting the color of each color block into one data segment containing three binary values in accordance with a decoding mapping rule, the decoding mapping rule involving: making grayscale values close to 0 equivalent to 0 and grayscale values close to 255 equivalent to 1, and based on a particular order of filtering, enabling the grayscale values of the color blocks to correspond to particular data segments consisting of 0 and 1; and successively de-grouping all the data segments according to an order of arrangement of the data segments, to form complete binary data code streams.

Further, when the particular order of filtering, in the decoding mapping rule, is red, green and blue in sequence, a corresponding relationship between each color and the data segment is as follows:

black corresponds to 000, blue corresponds to 001, green corresponds to 010, 011 corresponds to cyan, red corresponds to 100, magenta corresponds to 101, yellow corresponds to 110, and white corresponds to 111.

Further, the following procedures are also included:

determining the color of the obtained DM code image, and if the DM code image has a black and white DM code, then decoding the DM code image according to the Datamatrix decoding rule to obtain the source data information; if the DM code image has a 2D color code, then proceeding to the step of converting the color of each color block into one data segment containing three binary values in accordance with a mapping rule.

Further, the procedure of determining the color of the obtained DM code image involves:

determining that the DM code image has the black and white DM code if, in the three grayscale images, the grayscale values of all the color blocks having non-zero grayscale values are all identical, otherwise determining that the DM code image has the 2D color code.

Further, the procedure of determining, based on the obtained grayscale images, the positioning region and the coding region of the DM code image involves:

subjecting each grayscale image to Sobel operator's convolution computation and hough transform, respectively, to determine the positioning region of the DM code image, with the coding region of the DM code image being located inside the positioning region.

Also disclosed in the present invention is a generating device for the DM code, which includes a source data information reading module, a coding module, a grouping module, a converting module, and a generating module;

the source data information reading module is configured to read source data information;

the coding module is configured to convert the source data information into binary data code streams according to corresponding rules in Datamatrix coding rules;

the grouping module is configured to successively group the binary data code streams in groups of three values, so as to obtain several data segments;

the converting module is configured to convert each data segment into a corresponding color in accordance with a coding mapping rule, the coding mapping rule involving: making 1 equivalent to 255 and 0 equivalent to 0 in each data segment; and based on a particular order of coloring, successively enabling 0 and 255 in the data segment to correspond to each color channel of RGB, thereby generating particular colors; and the generating module is configured to generate a DM code image by filling color blocks in accordance with the converted colors and a filling rule in the Datamatrix coding rules.

Also disclosed in the present invention is a decoding device for the DM code, which includes a DM code reading module, a filtering module, a positioning module, a superposing module, an ordering module, and a decoding module;

the DM code reading module is configured to read a DM code image;

the filtering module is configured to perform successive filtering by three color channels, i.e., RGB, so as to obtain three coded grayscale images corresponding to each color channel, respectively;

the positioning module is configured to determine a positioning region and a coding region of the DM code image according to the obtained grayscale images;

the superposing module is configured to convert the color of each color block into one data segment containing three binary values in accordance with a decoding mapping rule, the decoding mapping rule involving: making grayscale values close to 0 equivalent to 0 and grayscale values close to 255 equivalent to 1, and based on a particular order of filtering, enabling the grayscale values of the color blocks to correspond to particular data segments consisting of 0 and 1;

the ordering module is configured to successively de-group all the data segments according to an order of arrangement of the data segments, to form complete binary data code streams; and the decoding module is configured to convert the binary data code streams into source data information according to corresponding rules in Datamatrix decoding rules.

Further, a determining module is also included, which is configured to determine the color of the obtained DM code image, and if the DM code image has a black and white DM code, then decode the DM code image according to the Datamatrix decoding rule to obtain the source data information; if the DM code image has a 2D color code, then proceed to the step of converting the color of each color block into one data segment containing three binary values in accordance with a mapping rule.

The present invention has the following advantageous effect: six colors are added on the basis of an original Datamatrix data structure, and form, together with the original two colors, i.e., black and white, a new color channel, thereby creating a 2D color code. There is a threefold increase in coding capacity compared with that before addition of the six colors, while at the same time maximally remaining compatible with the existing black and white Datamatrix coding system.

DESCRIPTION OF EMBODIMENTS

The present invention will be further described below with reference to the accompanying drawings. The embodiments that follow are merely used to more clearly illustrate the technical solution of the present invention, and are not intended to limit the scope of protection of the present invention.

For a better understanding of the content of the present invention, it is necessary to have a knowledge of the basic common sense of colors that are utilized in the present invention. The color generation involved in the present invention is classified into two categories: transmission and reflection. Transmission is typically used for CCD imaging in a display, which is featured by transmission of light having the same color as transmission filters and absorption of light having a different color than transmission filters. In a typical RGB color system, a transmission filter is placed in front of a charge coupled element (CCD). Each pixel is usually composed of at least one pixel point for each single color red R, green G and blue B, this is because only a color that is the same as one of the colors of the filter is perceived by the CCD and then an initial color of a pixel is restored based on the respective intensities of three primary colors RGB jointly, the intensities being determined according to different strength levels of signals perceived by the filter. In general, reflection is applied in printing. For example, yellow color is typically reflected by yellow ink. The basic primary colors utilized are cyan C, magenta M, yellow Y, and black. And the three primary colors RGB in transmission and the CMY primary colors in printing can be adjusted and converted exactly in equal proportions with each other. Therefore, reliable and distinguishable color information is offered.

Provided is a DM code. An image of the DM code consists of several color blocks arranged in a rectangular array, the colors of the color blocks include at least three of eight colors, the eight colors being three standard RGB colors, four standard CMYK colors, and white, a circle of color blocks on the edge of the image constitute a positioning region, and the color blocks inside the image constitute a coding region.

The positioning region includes an "L"-shaped edge and a positioning edge opposite to the "L"-shaped edge, the positioning edge is formed by alternately arranging color blocks of two colors that are black and white after filtering by a channel in any color of RGB.

The thus formed DM code image is filtered by three color channels in RGB to obtain three corresponding grayscale images, respectively. Among these grayscale images, there is a significant difference between the grayscale value of the "L"-shaped edge of at least one image and the grayscale value of the background color, and at least one image has the positioning edge that is alternately black and white, thus realizing the identification for the positioning region.

Figures 1, 2:
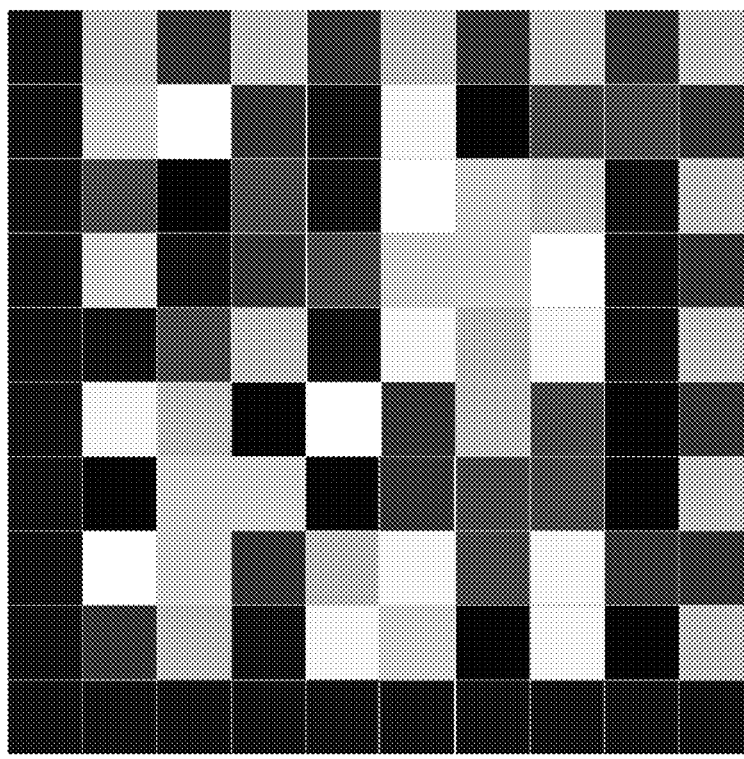
FIG. 1 is a schematic diagram of a Data Matrix (DM) code generated according to the present invention.
FIG. 2 shows binary information to which each DM code color block corresponds.
Figure 3:
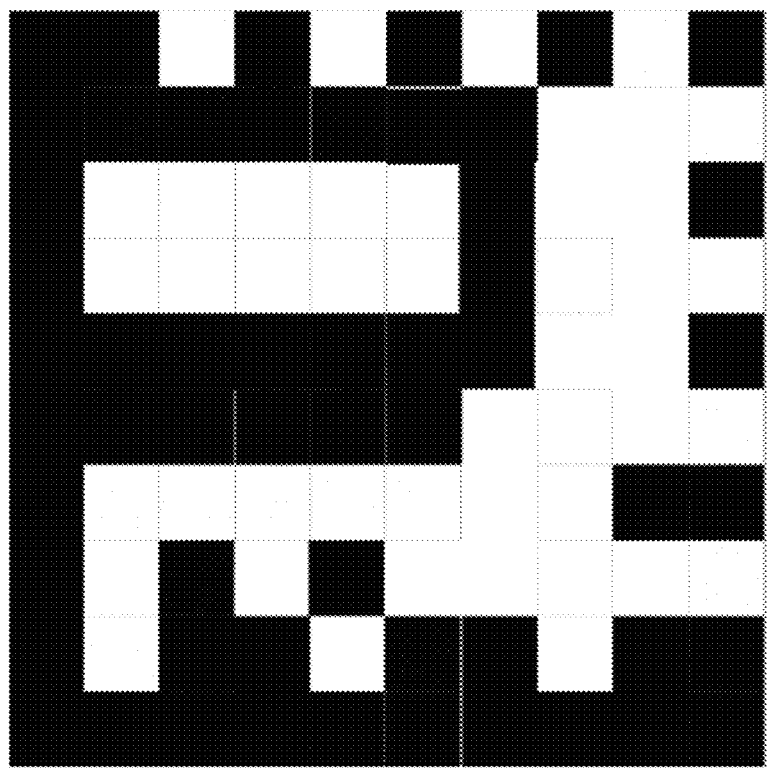
FIG. 3 is a binarized image that results from filtering of the DM code shown in FIG. 1 using a red channel.
Figure 4:
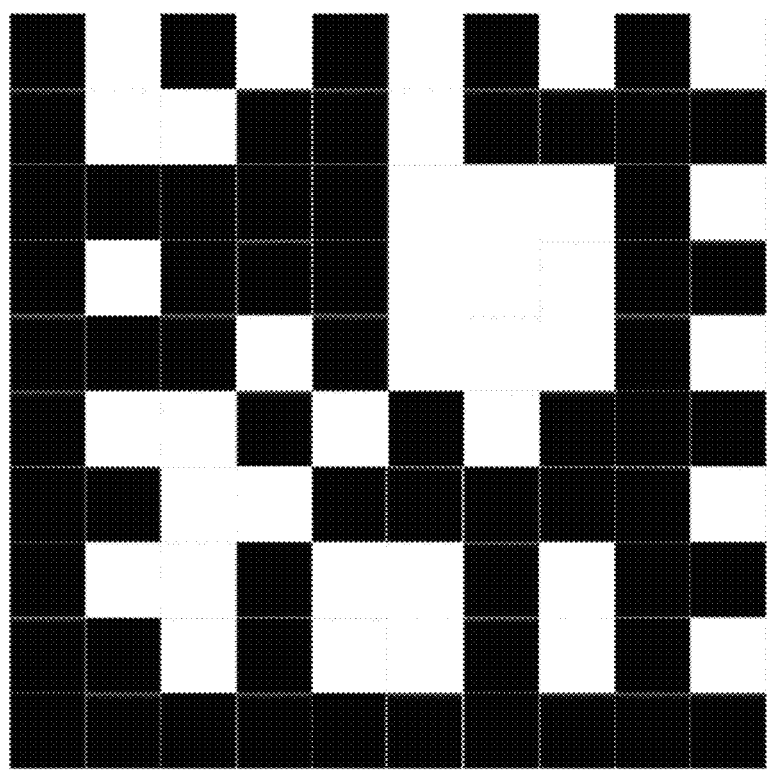
FIG. 4 is a binarized image that results from filtering of the DM code shown in FIG. 1 using a green channel.
Figure 5:
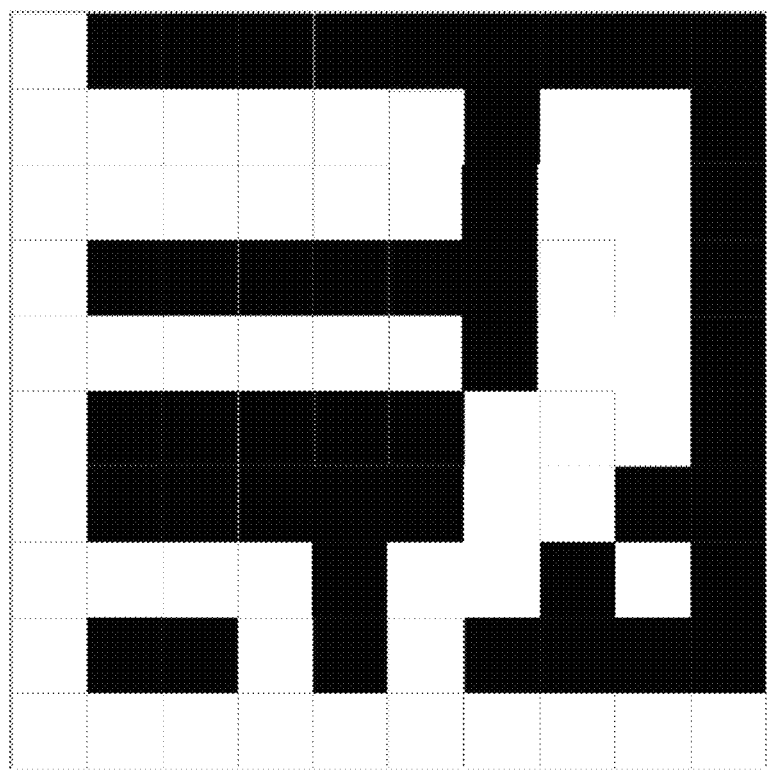
FIG. 5 is a binarized image that results from filtering of the DM code shown in FIG. 1 using a blue channel.

As shown in FIG. 1, in case that the background color is white and the color blocks of the "L"-shaped edge are set in blue, the color blocks of the positioning edge may be set in green and red, and the color blocks of these two colors are arranged alternately. Subsequent to RGB filtering, the images as shown in FIG. 3, FIG. 4, and FIG. 5 can be obtained, respectively. In FIG. 3 and FIG. 4, the "L"-shaped edge is black and the positioning edge is alternately black and white. In FIG. 5, the "L"-shaped edge is white and the positioning edge is black. As a result, the positioning region of the image can be identified and located through FIG. 3 and FIG. 4.

The color blocks in the coding region are set in corresponding colors, depending on actual coding situations, and are arranged in a datamatrixECC200 mode, i.e., coded as even rows and even columns. Coding units in the coding region are identical to 8-bit color blocks in Datamatrix, i.e., a 3*3 square matrix with its upper right corner missing. It thus can be seen that the color blocks in the DM code image are increased to 8 colors from the two colors, i.e., black and white, of standard Datamatrix, and each color block represents three different binary codes, rather than a traditional single binary number.

Based on the above DM code, the present invention also provides a generating method, which includes the following procedures:

S1: reading source data information.

S2: converting the source data information into binary data code streams according to corresponding rules in Datamatrix coding rules. This procedure may be done using the methods in the prior art. Broadly speaking, the source data information is coded according to computer coding rules.

A data prefix explanation is added before the codes in order to illustrate data length and the way of coding, and then error correction code words are generated based on a Reed-Solomon error correction algorithm, followed by addition of the generated error correction code words after the codes. Head and tail data identifiers are added according to the corresponding rules in the Datamatrix coding rules, so as to form a total data codeword, which is afterwards converted into binary data code streams.

S3: successively grouping the binary data code streams in groups of three values, so as to obtain several data segments.

S4: converting each data segment into a corresponding color in accordance with a coding mapping rule. In the present invention, the CMYK color system is used for the printing system and these four colors are standard colors for printing. Yet, color images are acquired through use of the RGB color system. In the CMYK color system, red can be obtained by mixing cyan with magenta once; green is obtained by mixing magenta with yellow once in equal amounts; and blue is obtained by mixing yellow with cyan once in equal amounts. Therefore, a definite conversion relationship is established for the colors between the two color systems to ensure the reliability of information conversion between color barcode printing colors and identification colors. In a color sensor that uses RGB channels for color filtering, since colors are attained by light perception of a photodiode of three color filters, the photodiode under each color filter can generate a corresponding electrical signal. The RGB color system contains color brightness that ranges from 0 to 255. Under any monochromatic channel of RGB, the 8 colors selected may lead to two signals, 0 and 255, which may be correspondingly considered as 1 or 0. By doing so, the processing of contamination clutter interferences by color channels is greatly simplified.

Thus, the coding mapping rule involves: making 1 equivalent to 255 and 0 equivalent to 0 in each data segment; and based on a particular order of coloring, successively enabling 0 and 255 in the data segment to correspond to each color channel of RGB, thereby generating particular colors.

The above-mentioned 8 colors may correspond accurately to different three-digit binary codes. During this procedure, when the particular order of coloring is red, green and blue in sequence, a corresponding relationship between the data segment and each color is shown in the following table:

| Color | RGBcolor value | CIE-Labcolor value | CMYKcolor value | Binary |
|---|---|---|---|---|
| Black | (0, 0, 0) | 100, 0.005, −0.01 | 0, 0, 0, 0 | 000 |
| Blue | (0, 0, 255) | 97.6, −15.8, 93.4 | 0, 0, 100, 0 | 001 |
| Green | (0, 255, 0) | 60.32, 98.254, −60.843 | 0, 100, 0, 0 | 010 |
| Cyan | (0, 255, 255) | 53.233, 80.109, 67.22 | 0, 100, 100, 0 | 011 |
| Red | (255, 0, 0) | 91.117, −48.08, −14.138 | 100, 0, 0, 0 | 100 |
| Magenta | (255, 0, 255) | 87.737, −86.185, 83.181 | 100, 0, 100, 0 | 101 |
| Yellow | (255, 255, 0) | 32.303, 79.197, −107.864 | 100, 100, 0, 0 | 110 |
| White | (255, 255, 255) | 0, 0, 0 | 0, 0, 0, 100 | 111 |

S5: generating a DM code image by filling color blocks in accordance with the colors converted in S4 and a filling rule in the Datamatrix coding rules.

As shown in FIG. 2 to FIG. 5, based on the above DM code, the present invention also provides a decoding method, which includes the following procedures:

S1: reading a DM code image;

S2: determining a positioning region and a coding region of the DM code image. In particular, this procedure involves: performing successive filtering on the DM code image using three color channels, i.e., RGB, so as to obtain three grayscale images corresponding to each color channel, and then subjecting each grayscale image to Sobel operator's convolution computation and hough transform, to determine the positioning region of the DM code image, with the coding region of the DM code image being located inside the positioning region.

S3: restoring the coding region to binary data code streams. In particular, this procedure involves: converting the brightness of each color block into one data segment containing three binary values in accordance with a decoding mapping rule; and successively de-grouping all the data segments according to an order of arrangement of the data segments, to form complete binary data code streams. The decoding mapping rule involves: making grayscale values close to 0 equivalent to 0 and grayscale values close to 255 equivalent to 1; and enabling the grayscale values, which are obtained based on a particular order of color channel filtering, to successively correspond to particular data segments consisting of 0 and 1. During this procedure, the order of filtering is consistent with the order of coloring in the coding procedure, and explanation is given herein below by way of a specific embodiment.

As shown in FIGS. 1, 3, 4, and 5, the color block at the upper left corner of the coding region of the DM code image is green, this image is successively filtered in an order of filtering of red, green and blue to obtain three corresponding grayscale images, respectively, and in these grayscale images, this green color block has grayscale values of 0, 255, 0, which are equivalent to 0, 1, 0, such that the data segment that is correspondingly formed by this color block is 010. In this way, all the color blocks can be successively converted to data segments consisting of 1 and 0. Likewise, this data segment 010 is equivalent to 02550 at the time of coding, and is then colored in an order of coloring of red, green and blue, i.e., the red channel has a value of 0, the green channel has a value of 255 and the blue channel has a value of 0, in which case the color to which this data segment corresponds is green. In this way, all the data segments can be successively converted to color blocks in corresponding colors.

It is worthy noting that when the order of coloring is changed to red, blue and green, i.e., the red channel has a value of 0, the blue channel has a value of 255 and the green channel has a value of 0, the color that is correspondingly formed by the data segment 010 is blue. Likewise, this blue color block has grayscale values of 0, 255, 0 after being filtered in an order of red, blue and green, so the data segment that is correspondingly formed by the blue color block is 010. A detailed description of the embodiments of other orders is not provided here.

S4: converting the binary data code streams into source data information according to corresponding rules in Datamatrix decoding rules.

Further, a DM code image including only black or/and white may be generated according to the above-mentioned generating method, so the following procedure may also be included:

determining the color of the obtained DM code image, and if the DM code image has a black and white DM code, then directly decoding the DM code image according to the existing Datamatrix decoding rule to obtain the source data information; if the DM code image has a 2D color code, then performing decoding according to the relevant step in S3. Further, the procedure of determining the color of the obtained DM code image involves: determining that the DM code image has the black and white DM code if, in the three grayscale images, the grayscale values of all the color blocks having non-zero grayscale values are all identical, otherwise determining that the DM code image has the 2D color code.

Further, the procedure of determining, based on the obtained grayscale images, the positioning region and the coding region of the DM code image involves: subjecting each grayscale image to Sobel operator's convolution computation and hough transform, respectively, to determine the positioning region of the DM code image, with the coding region of the DM code image being located inside the positioning region.

The present invention also provides a generating device for the DM code, which includes a source data information reading module, a coding module, a grouping module, a converting module, and a generating module.

The source data information reading module is configured to read source data information; the coding module is configured to convert the source data information into binary data code streams according to corresponding rules in Datamatrix coding rules; the grouping module is configured to successively group the binary data code streams in groups of three values, so as to obtain several data segments; the converting module is configured to convert each data segment into a corresponding color in accordance with a coding mapping rule, the coding mapping rule involving: making 1 equivalent to 255 and 0 equivalent to 0 in each data segment; and based on a particular order of coloring, successively enabling 0 and 255 in the data segment to correspond to each color channel of RGB, thereby generating particular colors; and the generating module is configured to generate a DM code image by filling color blocks in accordance with the converted colors and a filling rule in the Datamatrix coding rules.

The present invention also provides a decoding device for the DM code, which includes a DM code reading module, a filtering module, a positioning module, a superposing module, an ordering module, and a decoding module.

The DM code reading module is configured to read a DM code image; the filtering module is configured to perform successive filtering by three color channels, i.e., RGB, so as to obtain three coded grayscale images corresponding to each color channel, respectively; the positioning module is configured to determine a positioning region and a coding region of the DM code image according to the obtained grayscale images; the superposing module is configured to convert the color of each color block into one data segment containing three binary values in accordance with a decoding mapping rule, the decoding mapping rule involving: making grayscale values close to 0 equivalent to 0 and grayscale values close to 255 equivalent to 1, and based on a particular order of filtering, enabling the grayscale values of the color blocks to correspond to particular data segments consisting of 0 and 1; the ordering module is configured to successively de-group all the data segments according to an order of arrangement of the data segments, to form complete binary data code streams; and the decoding module is configured to convert the binary data code streams into source data information according to corresponding rules in Datamatrix decoding rules.

Further, a determining module is further included, which is configured to: determine the color of the obtained DM code image, and if the DM code image has a black and white DM code, then decode the DM code image according to the Datamatrix decoding rule to obtain the source data information; if the DM code image has a 2D color code, then proceed to the step of performing successive filtering on the DM code image in accordance with a mapping rule so as to obtain binary images corresponding to each color channel.

In the present invention, both the Datamatrix coding rules and the Datamatrix decoding rules are existing rules. Therefore, the corresponding rules are those that correspond to the corresponding steps, and their detailed procedures are not described here.

The description above is only the preferred implementations of the present invention. It should be noted that for those ordinary skilled in the art, without departing from the technical principles of the present invention, several improvements and modifications can be made. These improvements and modifications shall also be regarded as the scope of protection of the present invention.

What is claimed is:

1. A Data Matrix (DM) code generating method, comprising:
    reading source data information; and
    converting the source data information into a binary data code stream according to corresponding rules in Datamatrix coding rules;
    successively dividing the binary data code stream into groups of three values, so as to obtain a plurality of data segments;
    converting each data segment into a corresponding color in accordance with a coding mapping rule, the coding mapping rule including: mapping 1 in each data segment as being equivalent to 255 and mapping 0 in each data segment as being equivalent to 0; and based on a particular coloring order, successively corresponding 0 and 255 in each data segment to a color channel of RGB, thereby generating particular colors; and
    generating a DM code image by filling color blocks in accordance with the particular colors and a filling rule in the Datamatrix coding rules, an image of the DM code including a plurality of color blocks arranged in arrays that form a rectangle, peripheral color blocks located on edges of the image constituting a positioning region, and inner color blocks inside the image constituting a coding region; the positioning region comprising an "L"-shaped edge and a positioning edge opposite to the "L"-shaped edge;
wherein:
    colors of the plurality of color blocks comprise at least three of eight colors, the eight colors being three standard RGB colors, four standard CMYK colors, and white; and
    the positioning edge is formed by alternately arranging black color blocks and white color blocks, the black color blocks being obtained after filtering a channel in any color of RGB to black, and the white color blocks being obtained by filtering the channel to white.

2. The method according to claim 1, wherein:
when the particular coloring order, in the coding mapping rule, is red, green and blue in sequence, a corresponding relationship between each data segment and each color is as follows:
000 corresponds to black, 001 corresponds to blue, 010 corresponds to green, 011 corresponds to cyan, 100 corresponds to red, 101 corresponds to magenta, 110 corresponds to yellow, and 111 corresponds to white.

3. A DM code decoding method, comprising:
    reading a DM code image, the DM code image including a plurality of color blocks arranged in arrays that form a rectangle, peripheral color blocks located on edges of the image constituting a positioning region, and inner color blocks inside the image constituting a coding region; the positioning region comprising an "L"-shaped edge and a positioning edge opposite to the "L"-shaped edge, wherein colors of the plurality of color blocks comprise at least three of eight colors, the eight colors being three standard RGB colors, four standard CMYK colors, and white; and the positioning edge is formed by alternately arranging black color blocks and white color blocks, the black color blocks being obtained after filtering a channel in any color of RGB to black, and the white color blocks being obtained by filtering the channel to white;
    determining the positioning region and the coding region of the DM code image;
    restoring the coding region to binary data code streams; and
    converting the binary data code streams into source data information according to corresponding rules in Datamatrix decoding rules;
wherein:
    determining a positioning region and a coding region of the DM code image comprises:
        performing successive filtering by three color channels, RGB, so as to obtain three coded grayscale images corresponding to each color channel, respectively; and
        determining, based on the obtained grayscale images, the positioning region and the coding region of the DM code image;
    restoring the coding region to binary data code streams comprises:
        converting the color of each color block into one data segment containing three binary values in accordance with a decoding mapping rule, the decoding mapping rule involving: making grayscale values close to 0 equivalent to 0 and grayscale values close to 255 equivalent to 1, and based on a particular order of filtering, enabling the grayscale values of the color blocks to correspond to particular data segments consisting of 0 and 1; and
        successively de-grouping all the data segments according to an order of arrangement of the data segments, to form complete binary data code streams.

4. The method according to claim 3, wherein:
when the particular order of filtering, in the decoding mapping rule, is red, green and blue in sequence, a corresponding relationship between each color and the data segment includes:
black corresponds to 000, blue corresponds to 001, green corresponds to 010, cyan corresponds to 011, red corresponds to 100, magenta corresponds to 101, yellow corresponds to 110, and white corresponds to 111.

5. The method according to claim 3, further comprising:
determining the colors of the obtained DM code image, and if the DM code image has a black and white DM code, then decoding the DM code image according to the Datamatrix decoding rule to obtain the source data information; if the DM code image has a 2D color code, then proceeding to the step of converting the color of each color block into one data segment containing three binary values in accordance with a mapping rule.

6. The method according to claim 5, wherein determining the colors of the obtained DM code image comprises:
determining that the DM code image has the black and white DM code if, in the three grayscale images, the grayscale values of all the color blocks having non-zero grayscale values are all identical, otherwise determining that the DM code image has the 2D color code.

7. The method according to claim 3, wherein determining, based on the obtained grayscale images, the positioning region and the coding region of the DM code image comprises:
subjecting each grayscale image to Sobel operator's convolution computation and hough transform, respectively, to determine the positioning region of the DM code image, with the coding region of the DM code image being located inside the positioning region.

8. A DM code analysis device comprising: a source data information reading module, a coding module, a grouping module, a converting module, and a generating module; wherein:
the source data information reading module is configured to read source data information;
the coding module is configured to convert the source data information into binary data code streams according to corresponding rules in Datamatrix coding rules;
the grouping module is configured to successively group the binary data code streams in groups of three values, so as to obtain several data segments;
the converting module is configured to convert each data segment into a corresponding color in accordance with a coding mapping rule, the coding mapping rule involving: making 1 equivalent to 255 and 0 equivalent to 0 in each data segment; and based on a particular order of coloring, successively enabling 0 and 255 in the data segment to correspond to each color channel of RGB, thereby generating particular colors; and
the generating module is configured to generate a DM code image by filling color blocks in accordance with the particular colors and a filling rule in the Datamatrix coding rules, an image of the DM code including a plurality of color blocks arranged in arrays that form a rectangle, peripheral color blocks located on edges of the image constituting a positioning region, and inner color blocks inside the image constituting a coding region; the positioning region comprising an "L"-shaped edge and a positioning edge opposite to the "L"-shaped edge;
wherein:
colors of the plurality of color blocks comprise at least three of eight colors, the eight colors being three standard RGB colors, four standard CMYK colors, and white; and
the positioning edge is formed by alternately arranging black color blocks and white color blocks, the black color blocks being obtained after filtering a channel in any color of RGB to black, and the white color blocks being obtained by filtering the channel to white.

9. The device according to claim 8, further comprising: a DM code reading module, a filtering module, a positioning module, a superposing module, an ordering module, and a decoding module; wherein:
the DM code reading module is configured to read a target DM code image to be decoded;
the filtering module is configured to perform successive filtering by three color channels, RGB, so as to obtain three coded grayscale images corresponding to each color channel, respectively;
the positioning module is configured to determine a positioning region and a coding region of the target DM code image according to the obtained grayscale images;
the superposing module is configured to convert the color of each color block into one data segment containing three binary values in accordance with a decoding mapping rule, the decoding mapping rule involving: making grayscale values close to 0 equivalent to 0 and grayscale values close to 255 equivalent to 1, and based on a particular order of filtering, enabling the grayscale values of the color blocks to correspond to particular data segments consisting of 0 and 1;
the ordering module is configured to successively de-group all the data segments according to an order of arrangement of the data segments, to form complete binary data code streams; and
the decoding module is configured to convert the binary data code streams into source data information according to corresponding rules in Datamatrix decoding rules.

10. The device according to claim 9, wherein:
the decoding device further comprises a determining module configured to: determine the colors of the target DM code image, and if the target DM code image has a black and white DM code, then decode the target DM code image according to the Datamatrix decoding rule to obtain the source data information; if the target DM code image has a 2D color code, then proceed to the step of converting the color of each color block into one data segment containing three binary values in accordance with a mapping rule.

* * * * *